United States Patent [19]  [11] 4,116,110
Dines  [45] Sep. 26, 1978

[54] METHOD AND APPARATUS FOR FORMING INTERNAL RECESSES IN A HOLLOW BODY

[75] Inventor: Jack E. Dines, Fort Worth, Tex.

[73] Assignee: Jet Research Center, Inc., Arlington, Tex.

[21] Appl. No.: 758,298

[22] Filed: Jan. 10, 1977

[51] Int. Cl.² ............................ B23C 1/20; B23C 1/00
[52] U.S. Cl. ...................................... 90/12 R; 90/15 R
[58] Field of Search ................. 90/11 C, 15 A, 15 B, 90/15, 12

[56] References Cited

U.S. PATENT DOCUMENTS

| 1,245,238 | 11/1917 | Jones | 90/15 B |
|---|---|---|---|
| 1,403,555 | 1/1922 | Jolls | 90/15 B |
| 1,430,933 | 10/1922 | Brandt et al. | 90/15 B |
| 2,578,195 | 12/1951 | Merrill | 90/12 X |
| 2,583,429 | 1/1952 | Johnson | 90/12 X |
| 2,969,000 | 1/1961 | Grobecker | 90/12 |
| 3,464,313 | 9/1969 | Shay et al. | 90/12 |

FOREIGN PATENT DOCUMENTS 1,349,060  3/1974  United Kingdom .................... 90/15 B

*Primary Examiner*—Harrison L. Hinson
*Attorney, Agent, or Firm*—Thomas R. Weaver; John H. Tregoning; C. Clark Dougherty, Jr.

[57] ABSTRACT

Apparatus for forming a recess in an internal surface of an elongated hollow body comprised of a housing having a rotary mill and means for rigidly clamping the housing at a desired position within the interior of the body attached thereto. Means operable from the exterior of the body are provided for clamping the housing within the interior of the body and selectively moving the mill into contact wth an interior surface of the body whereby a recess is formed therein.

8 Claims, 4 Drawing Figures

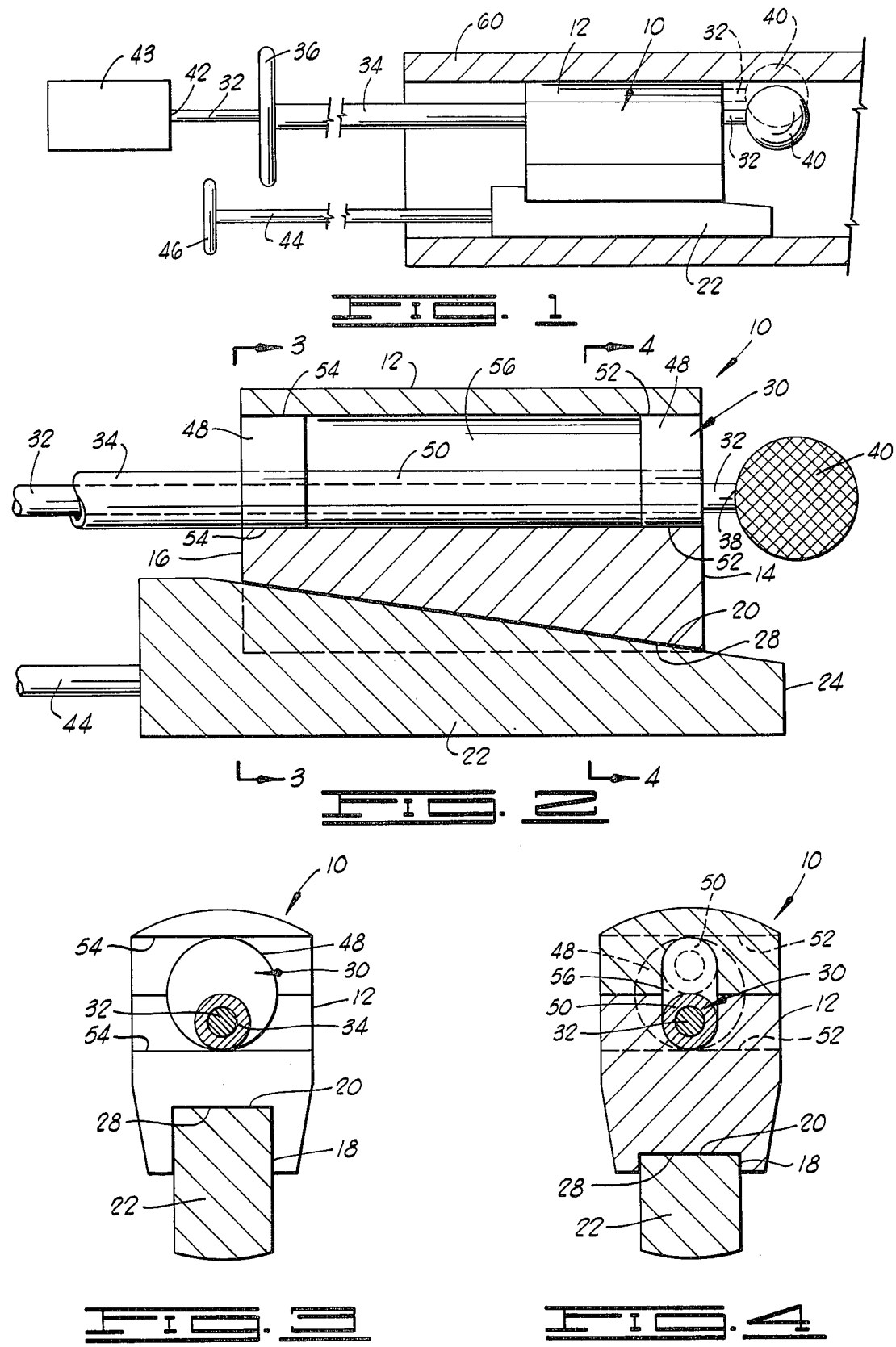

METHOD AND APPARATUS FOR FORMING INTERNAL RECESSES IN A HOLLOW BODY

The present invention relates to methods and apparatus for forming internal recesses in a hollow body, and more particularly, but not by way of limitation, to methods and apparatus for milling one or more recesses in the internal surface of a hollow body such as an elongated conduit.

In industrial applications, it is sometimes necessary and/or desirable to form one or more recesses within the interior of an elongated hollow body. For example, in the completion of oil and gas wells, perforating apparatus is commonly lowered through small diameter tubing disposed in the well bore to the producing zone, actuated to form perforations through the casing and cement in the well bore and then retrieved by raising the apparatus back through the tubing string. One form of such perforating apparatus includes an array of shaped charges disposed within an elongated tubular carrier. Upon actuation of the shaped charges, the carrier is penetrated immediately in front of each shaped charge but remains substantially intact so that debris produced is retained within the carrier and retrieved from the well bore.

As disclosed in my co-pending application Ser. No. 758,299, filed Jan. 10, 1977, now U.S. Pat. No. 4,091,096 it is advantageous to design shaped charge well perforating apparatus so that the distance that the jets formed by the detonation of the shaped charges can travel before meeting an obstruction, i.e., the internal surface of the carrier wall, is as great as possible. Such distance is commonly referred to as "stand-off", and even slight increases in the stand-off utilized significantly improves the performance of the perforating apparatus. One aspect of my invention described and claimed in the aforesaid application involves the formation of one or more recesses in the perforating apparatus carrier immediately in front of each shaped charge disposed therein thereby increasing the stand-off available for a particular size of carrier and improving the operation of the apparatus. Since such carriers are of relatively small diameter, forming one or more recesses in the internal surfaces thereof has heretofore been difficult. By the present invention, methods and apparatus for forming one or more internal recesses in shaped charge carriers and other similar hollow bodies are provided which allow one or a plurality of recesses to be formed in a quick, accurate and efficient manner.

The apparatus of the present invention for forming a recess in an internal surface of a hollow body is comprised of a housing adapted to be positioned within the interior of the body having means for rigidly clamping the housing therein attached thereto. A rotary mill for forming a recess in an internal surface of the body is rotatably attached to the housing and means are provided attached to the housing for rotating the mill and selectively moving the mill relative to the housing between a position out of contact with the internal surface of the body and a position whereby the mill forms a recess of desired depth in the internal surface of the body.

In the accompanying drawings forming a part of this disclosure:

FIG. 1 is a partly cross-sectional side view of the apparatus of the present invention positioned within an elongated hollow body;

FIG. 2 is an enlarged side cross-sectional view of a portion of the apparatus of the present invention;

FIG. 3 is a cross-sectional view taken along line 3—3 of FIG. 2; and

FIG. 4 is a cross-sectional view taken along line 4—4 of FIG. 2.

Referring now to the drawings, the apparatus of the present invention is generally designated by the numeral 10. As best shown in FIGS. 2-4, the apparatus 10 includes a housing 12 having a forward end 14 and a rearward end 16. A rectangular shaped recess 18 is provided along a side of the housing 12 having a flat tapered internal surface 20. A wedge-shaped gib 22 having a forward end 24 and a rearward end 26 is disposed within the recess 18 of the housing 12. The gib 22 includes a flat tapered surface 28 of the same slope as the tapered surface 20 of the housing 12 whereby the surfaces 20 and 28 slidably engage each other and relative longitudinal movement between the gib 22 and the housing 12 changes the distance between external opposite surfaces of the gib 22 and housing 12.

A hollow cam wheel member 30, which will be described in greater detail hereinbelow, is rotatably disposed within the housing 12, and a drive shaft 32 is journaled within and through the hollow interior of the cam wheel member 30. An elongated tubular member 34 is rigidly attached to the cam wheel member 30, and as shown in FIG. 1, the tubular member 34 terminates in a handle 36. The drive shaft 32 extends through the tubular member 34 and through the cam wheel member 30 with the forward end 38 thereof terminating at a position forward of the forward end 14 of the housing 12.

A bulbous file or mill 40 is rigidly attached to the forward end 38 of the shaft 32. The rearward end 42 of the shaft 32 is connected to an electric motor or other source of rotary power 43 for rotating the shaft 32 and the mill 40. An elongated shaft 44 is connected to the rearward end 26 of the gib 22 which terminates in a handle 46.

As best shown in FIGS. 2-4, the cam wheel member 30 includes a pair of identically oriented circular cam wheel portions 48 eccentrically attached to the ends of a tubular cam portion 50 of reduced diameter. At each end of the housing 12, upper and lower flat cam surfaces are provided for slidably engaging the peripheral flat surfaces of the cam wheel portions 48 of the member 30 and confining the portions 48 therebetween. That is, at the forward end 14 of the housing 12, a pair of flat parallel opposing surfaces 52 are provided for sliding engagement with the forward cam wheel portion 48 of the member 30. At the rearward end 16 of the housing 12, a pair of flat parallel opposing surfaces 54 are provided for sliding engagement with the rearward cam wheel portion 48. The central small diameter portion 50 of the member 30 is disposed within a slot 56 (FIG. 4) which extends longitudinally through the housing 12. The internal surfaces of the slot 56 guide the cam portion 50 of the member 30 causing it to reciprocate along a line perpendicular to the longitudinal axis of the housing 12 upon rotation of the member 30. That is, as the cam wheel member 30 is rotated, the cam wheel portions 48 thereof contact the cam surfaces 52 and 54 at the ends of the housing 12 and are confined therebetween which in turn causes the cam portion 50 of the member 30 to reciprocate within the slot 56 between the lower position shown in the drawings and an upper position shown in dashed lines in FIGS. 1 and 4. The reciprocation of the portion 50 of the member 30 causes the shaft 32 journaled within the member 30 to reciprocate in a like manner which in turn causes the mill 40 to reciprocate between a lower position and an upper position. The slot 56 is located at a position within the housing 12 and is of a size such that when the portion 50 of the member 30 is positioned at the bottom of the slot 56, the entirety of the mill 40 is positioned within the transverse cross sectional boundaries defined by external opposite surfaces of the gib 22 and the housing 12. When the portion 50 of the member 30 is positioned at the top of the slot 56, a portion of the mill 40 extends outside such boundaries, i.e., to a position whereby a portion of the mill 40 lies above the external top surface of the housing 12.

In operation of the apparatus 10, and referring specifically to FIG. 1, the housing 12 and gib 22 are positioned within the interior of a hollow body 60 within which it is desired to form one or more internal recesses. The tubular member 34, drive shaft 32 and shaft 44 extend by way of an open end of the body 60 to the exterior of the body 60. Prior to positioning the housing 12 and gib 22 within the interior of the body 60, the handle 36 of the tubular member 34 is rotated whereby the portion 50 of the cam wheel member 30 is positioned at the bottom of the slot 56 within the housing 12 thereby positioning the mill 40 within the boundaries defined by external opposite surfaces of the gib 22 and housing 12. The apparatus 10 is moved with respect to the body 60 whereby the mill 40 is positioned adjacent an internal surface of the body 60 within which it is desired to form a recess. By means of the handles 36 and 46 attached to the tubular member 34 and shaft 44, the housing 12 is maintained in a stationary position while the gib 22 is moved forward relative to the housing 12 thereby causing external opposite surfaces of the gib 22 and housing 12 to be wedged against adjacent internal surfaces of the body 60 and the housing 12 and gib 22 to be rigidly held or locked within the interior of the body 60. The rotary power source 43 is activated so that the shaft 32 and mill 40 attached to the forward end thereof are rotated. The tubular member 34 is next rotated which rotates the cam wheel member 30 causing the mill 40 to be moved into contact with an internal surface of the body 60 and a recess of the desired depth to be milled into the internal surface of the body 60. Upon completion of the milling of the recess, the tubular member 34 is rotated to retract the mill 40 from the internal surface of the body 60. The gib 22 is then moved relative to the housing 12 so that the apparatus 10 is unlocked or disengaged from the interior surfaces of the body 60 and the apparatus 10 is withdrawn from the body 60. Alternatively, the housing 12 and gib 22 are moved to one or more different positions within the interior of the body 60 and the procedure described above repeated to form additional recesses in internal surfaces of the body 60.

As will be understood, the tubular member 34, drive shaft 32 and shaft 44 are all of lengths greater than the length of the hollow interior of the body 60, or at least greater than the distance between the open end of the body 60 and the innermost recess to be formed within the interior of the body 60 so that the handles 36 and 46 and rotary power source 43 attached to the rearward end of the drive shaft 32 remain outside the body 60.

What is claimed is:

1. An apparatus for forming a recess in an internal surface of a body having a hollow interior which comprises:

a housing adapted to be positioned within said interior of said body;
clamping means for rigidly positioning said housing in a desired location within said body wherein said clamping means comprises:
a tapered surface along a side of said housing;
a gib having a tapered surface positioned adjacent to and slidably engaging said tapered surface of said housing whereby relative longitudinal movement between said gib and said housing changes the distance between external opposite surfaces of said gib and said housing; and
means for longitudinally moving said gib with respect to said housing attached thereto so that said external opposite surfaces of said gib and said housing can be selectively wedged against adajcent internal surfaces of said body at desired positions therein;
a mill rotatably attached to said housing for grinding a recess in said internal surface of said body;
reciprocating means attached to said housing for selectively moving said mill relative to said housing along a line perpendicular to the longitudinal axis of said housing between a position out of contact with said internal surface and a position in contact with said internal surface whereby said mill forms a recess of desired depth in said internal surface; and
power means for rotating said mill.

2. The apparatus of claim 1 wherein said reciprocating means comprises:
cam wheel means rotatably attached within said housing and eccentrically attached to said mill whereby rotation of said cam wheel means moves said mill relative to said housing along a line perpendicular to the longitudinal axis of said housing between a position within the boundaries defined by said external opposite surfaces of said gib and said housing and a position whereby a portion of said mill extends beyond said boundaries; and
means for selectively rotating said cam wheel means attached thereto.

3. The apparatus of claim 2 wherein said mill is bulbous in shape.

4. Apparatus for forming one or more recesses at desired locations of the internal surface of an elongated body having a hollow interior which comprises:
a housing adapted to be positioned within the interior of said body having a forward end and a rearward end and having a tapered recessed surface along a side thereof;
a gib having a forward end and a rearward end and having a tapered surface positioned adjacent to and slidably engaging said tapered recessed surface of said housing whereby relative longitudinal movement between said gib and said housing changes the distance between external opposite surfaces of said gib and said housing;
means attached to said gib for longitudinally moving said gib with respect to said housing whereby said external opposite surfaces of said gib and said housing can be selectively wedged against internal surfaces of said body at desired positions therein;
an elongated drive shaft having a forward end and a rearward end said forward end longitudinally extending through said housing whereby said forward end of said drive shaft is positioned in front of said forward end of said housing, said drive shaft being of a length greater than the distance between an open end of said body and the innermost recess to be formed within the interior of said body;

a bulbous mill attached to said forward end of said drive shaft;

means for rotating said drive shaft attached to said rearward end thereof;

cam wheel means rotatably disposed within said housing and eccentrically journaled to said drive shaft whereby rotation of said cam wheel means causes said drive shaft and said mill to be moved relative to said housing along a line perpendicular to the longitudinal axis of said housing between a position whereby said mill lies within the boundaries defined by said external opposite surfaces of said gib and said housing and a position whereby a portion of said mill extends outside said boundaries; and means for selectively rotating said cam wheel means attached thereto.

5. The apparatus of claim 4 wherein said means for longitudinally moving said gib with respect to said housing comprises:

a first elongated shaft having a forward end thereof attached to said rearward end of said gib and a rearward end thereof formed into a handle, the length of said first shaft being greater than the distance between an open end of said body and the innermost recess to be formed within the interior of said body; and a second elongated shaft having a forward end thereof attached to said cam wheel means at said rearward end of said housing and the rearward end thereof formed into a handle, the length of said second shaft being greater than the distance between an open end of said body and the innermost recess to be formed therein.

6. The apparatus of claim 5 wherein said second shaft is hollow and said drive shaft is rotatably extended therethrough.

7. The apparatus of claim 6 wherein said cam wheel means comprises:

a hollow cam member rotatably confined within said housing which includes a pair of cam wheel portions eccentrically attached to the ends of a tubular cam portion of reduced diameter having a hollow interior;

said drive shaft being journaled within and through the hollow interior of said cam member; and said housing including internal surfaces positioned with respect to said cam member whereby when said cam member is rotated said internal surfaces cause said tubular portion of said cam member and said drive shaft journaled therewithin to reciprocate along a line perpendicular to the longitudinal axis of said housing.

8. The apparatus of claim 7 wherein said means for selectively rotating said cam wheel means comprises:

said second shaft being rigidly attached to said cam member whereby rotation of said second shaft rotates said cam member.

* * * * *